(12) United States Patent
Waldner et al.

(10) Patent No.: US 9,995,281 B2
(45) Date of Patent: Jun. 12, 2018

(54) DRIVE AND METHOD FOR OPERATING SUCH A DRIVE

(71) Applicant: SET SUSTAINABLE ENERGY TECHNOLOGIES GMBH, Klagenfurt am Worthersee (AT)

(72) Inventors: Markus Waldner, Klagenfurt (AT); Gerald Hehenberger, Klagenfurt (AT)

(73) Assignee: SET SUSTAINABLE ENERGY TECHNOLOGIES GMBH, Klagengurt am Worthersee (AT)

( * ) Notice: Subject to any disclaimer, the term of this patent is extended or adjusted under 35 U.S.C. 154(b) by 104 days.

(21) Appl. No.: 14/785,377

(22) PCT Filed: Jan. 9, 2014

(86) PCT No.: PCT/AT2014/000003
§ 371 (c)(1),
(2) Date: Oct. 19, 2015

(87) PCT Pub. No.: WO2014/169302
PCT Pub. Date: Oct. 23, 2014

(65) Prior Publication Data
US 2016/0084228 A1    Mar. 24, 2016

(30) Foreign Application Priority Data

Apr. 18, 2013 (AT) .................................. A 326/2013

(51) Int. Cl.
*F03D 9/00* (2016.01)
*H02P 9/00* (2006.01)
(Continued)

(52) U.S. Cl.
CPC ............. *F03D 9/003* (2013.01); *F03D 9/255* (2017.02); *F03D 15/00* (2016.05); *H02P 9/007* (2013.01);
(Continued)

(58) Field of Classification Search
CPC .......... F03D 9/255; F03D 15/00; F03D 9/003; H02P 9/007
See application file for complete search history.

(56) References Cited

U.S. PATENT DOCUMENTS 7,819,019 B2   10/2010   Bisgaard
7,839,008 B2   11/2010   Woldmann et al.
(Continued)

FOREIGN PATENT DOCUMENTS

CN    1162214 A      10/1997
CN    101484696 A     7/2009
(Continued)

OTHER PUBLICATIONS

International Search Report, dated Apr. 7, 2014, from corresponding PCT application.
(Continued)

*Primary Examiner* — Viet Nguyen
(74) *Attorney, Agent, or Firm* — Young & Thompson

(57) ABSTRACT

A drive of an energy generation system with a drive shaft (9) has an electrical machine (8) which is connected to a power system (10), and a differential gear mechanism (3) with three drives and outputs, wherein a first drive is connected to the drive shaft (9), an output is connected to the electric machine (8), and a second drive is connected to a differential drive (6) which is connected via a frequency converter (7) and optionally a transformer (5) to the power system (10). The electric machine (8) can be connected to the frequency converter (7) and as result full converter mode can continue to be operated at relatively low wind speeds.

15 Claims, 3 Drawing Sheets

Figure 1:
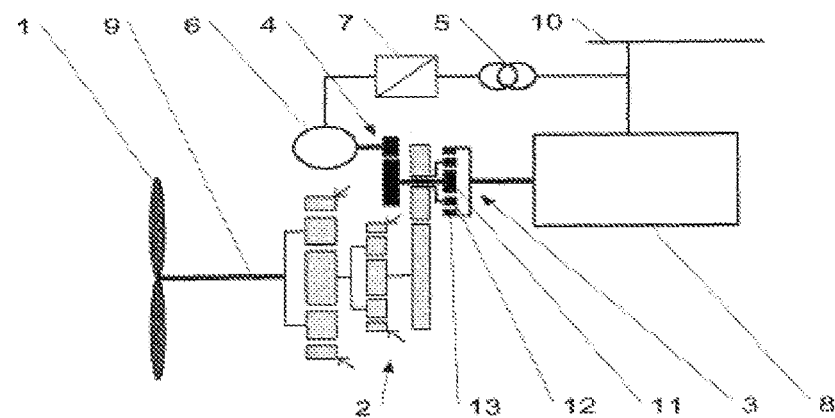

(51) Int. Cl.
*F03D 15/00* (2016.01)
*F03D 9/25* (2016.01)
(52) U.S. Cl.
CPC ..... *F05B 2260/40311* (2013.01); *Y02E 10/72* (2013.01)

(56) References Cited

U.S. PATENT DOCUMENTS

| | | | |
|---|---|---|---|
| 8,154,141 B2 | 4/2012 | Andresen | |
| 8,790,203 B2 | 7/2014 | Hehenberger | |
| 2008/0054642 A1* | 3/2008 | Nitzpon | F03D 9/255 290/44 |
| 2008/0054643 A1* | 3/2008 | Nitzpon | F03D 7/0272 290/44 |
| 2008/0066569 A1 | 3/2008 | Henenberger | |
| 2009/0060000 A1 | 3/2009 | Molev-Shteiman et al. | |
| 2009/0107256 A1* | 4/2009 | Jensen | F03D 80/50 73/862 |
| 2009/0273187 A1* | 11/2009 | Gertmar | F03D 9/25 290/44 |
| 2009/0302608 A1* | 12/2009 | Andresen | F03D 7/0224 290/44 |
| 2010/0060000 A1* | 3/2010 | Scholte-Wassink | F03D 7/0272 290/44 |
| 2010/0096853 A1* | 4/2010 | Woldmann | H02J 3/18 290/44 |
| 2010/0176606 A1* | 7/2010 | Gilchrist, III | H02J 3/08 290/40 C |
| 2010/0308857 A1* | 12/2010 | Saniter | H02P 9/102 324/764.01 |
| 2011/0140534 A1* | 6/2011 | Yasugi | H02J 3/005 307/80 |
| 2011/0175355 A1* | 7/2011 | Rosenvard | F03D 7/048 290/44 |
| 2011/0278858 A1* | 11/2011 | Hehenberger | H02P 9/04 290/1 C |
| 2012/0032443 A1 | 2/2012 | Hehenberger | |
| 2012/0068461 A1* | 3/2012 | Luetze | F03D 9/003 290/44 |
| 2012/0115661 A1* | 5/2012 | Hehenberger | F03D 15/00 475/5 |
| 2012/0133155 A1 | 5/2012 | Sorg | |
| 2013/0009408 A1* | 1/2013 | Crane | F04B 17/02 290/4 D |
| 2013/0264865 A1* | 10/2013 | Sugeno | H02J 5/00 307/9.1 |
| 2013/0270826 A1* | 10/2013 | Zhu | H02P 9/007 290/44 |
| 2014/0334950 A1* | 11/2014 | Qiu | E21B 43/126 417/410.1 |

FOREIGN PATENT DOCUMENTS

| | | |
|---|---|---|
| CN | 101512143 A | 8/2009 |
| CN | 101608603 A | 12/2009 |
| CN | 102483039 A | 5/2012 |
| CN | 202215429 U | 5/2012 |
| DE | 10 2009 028612 A1 | 2/2011 |
| EP | 1 895 157 A2 | 3/2008 |
| EP | 1919055 A2 | 5/2008 |
| EP | 2 449 258 A | 8/2015 |
| GB | 2 429 342 A | 2/2007 |
| WO | 2006/010190 A1 | 2/2006 |
| WO | 2010/063052 A2 | 6/2010 |
| WO | 2010/121782 A1 | 10/2010 |
| WO | 2011/000008 A1 | 1/2011 |
| WO | 2013020148 A2 | 2/2013 |

OTHER PUBLICATIONS

AT Search Report, dated May 15, 2014, from corresponding AT application.
Chinese Office Action, dated Nov. 3, 2017, from corresponding CN application 201480021691.1.

* cited by examiner

State of the Art

DRIVE AND METHOD FOR OPERATING SUCH A DRIVE

BACKGROUND OF THE INVENTION

Field of the Invention

The invention relates to a drive and method for operating such a drive.

Description of the Related Art

For example, in the case of large wind power plants, which in most cases are operated at variable speeds, speed fluctuations can be compensated for by an electromechanical differential system in such a way that an electrically-activated synchronous generator can be connected directly to the public power grid. In this case, the high-loss problem that arises in a conventional low-voltage full converter approach due to the double conversion of the generator output into direct current and back again into alternating current is avoided.

The available speed variability is, however, limited. This means that primarily the lower speed range (in the case of low wind speeds) cannot be covered by this principle. According to EP 2 449 258 A, it is the state of the art to achieve a speed amplification in such a way that the transmission ratio of the differential gear is set at 1. The synchronous generator is in this case removed from the grid since it is now no longer possible to adapt rpm to the grid frequency. However, the differential drive that is available in an electromechanical differential system can now be used as a generator in the full converter operation. The transmission ratio of the differential gear that is selected for the optimal sizing of the differential system is no longer effective in this mode of operation, however, by which the torque to be determined for the sizing of the differential drive is already reached at relatively low speeds and thus the power output that is actually present because of the wind can be used only partially.

Moreover, the equipping of the electromechanical differential system according to EP 2 449 258 A with a coupling, with which the transmission ratio of the differential gear can be set at 1, requires an additional expense with regard to design.

In addition, during coupling, it must be ensured that synchronization takes place, which means a specific control-engineering expense, since an excessive differential speed can result in damage to the coupling.

SUMMARY OF THE INVENTION

The object of the invention is therefore to find an alternative approach with which the differential drive can be operated as the sole generator.

In the case of an energy-generating unit with low drive-shaft speeds, the speed of the differential drive is preferably set at 0. The run-up to speed 0 is preferably actively achieved by the differential drive itself. As soon as it has reached the latter, the differential drive is secured by a brake. Then, the differential drive can be separated from the electrical supply or the power grid. The electrical machine, e.g., a synchronous generator, is also separated from the power grid and switched to the electrical supply of the differential drive. Since the differential drive is a three-phase a.c. machine, which is connected to the grid via a frequency converter and optionally a transformer, the synchronous generator can now be further operated via the frequency converter and the transformer of the three-phase a.c. machine.

Corresponding to the current speed and the activation, electrical power is generated by the synchronous generator, which is now supplied to the grid, however, via the frequency converter and the transformer in the full converter mode. The advantage of this concept is that no synchronization is required when the synchronous generator is switched into the full converter mode, and also no expensive coupling has to be incorporated into the differential gear. Since the differential drive has the speed 0, the variable generator speed now depends on the constant transmission ratio of the differential gear.

The drive according to the invention and the method according to the invention can also be used in the industry-drive approaches in the areas of pumps, pump-turbines, compressor drives, and the like.

BRIEF DESCRIPTION OF THE DRAWING FIGURES

Additional features and advantages of the invention follow from the subsequent description of preferred embodiments of the invention with reference to the attached drawings.

Figure 2:
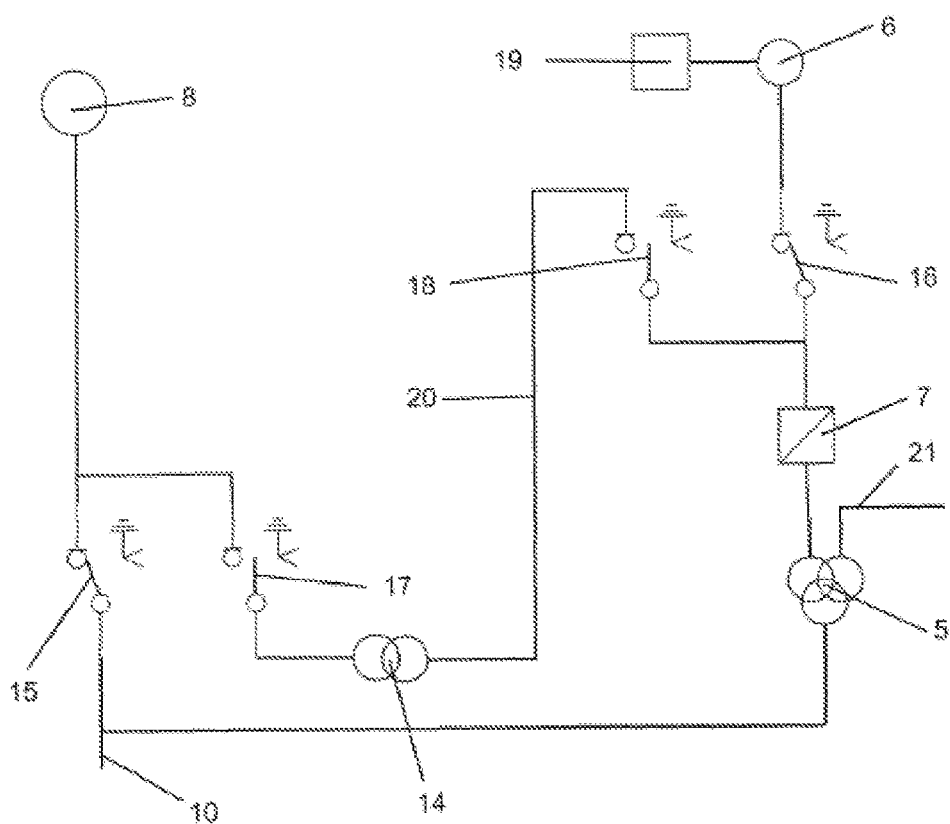
Figure 3:
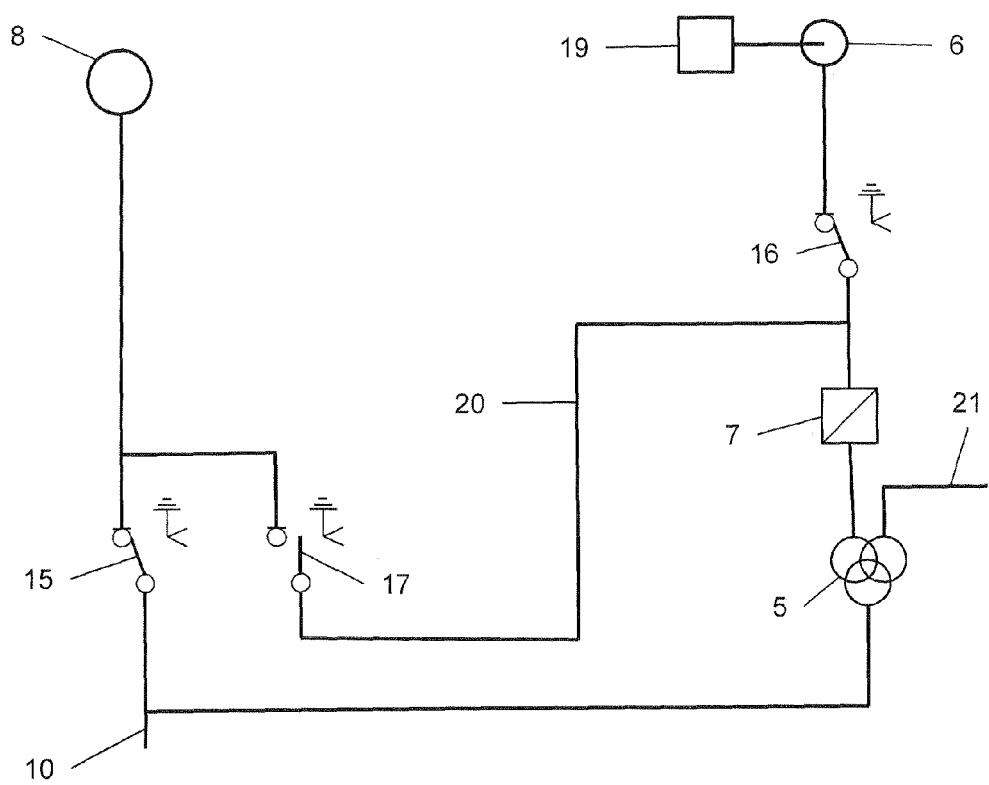
Figure 4:
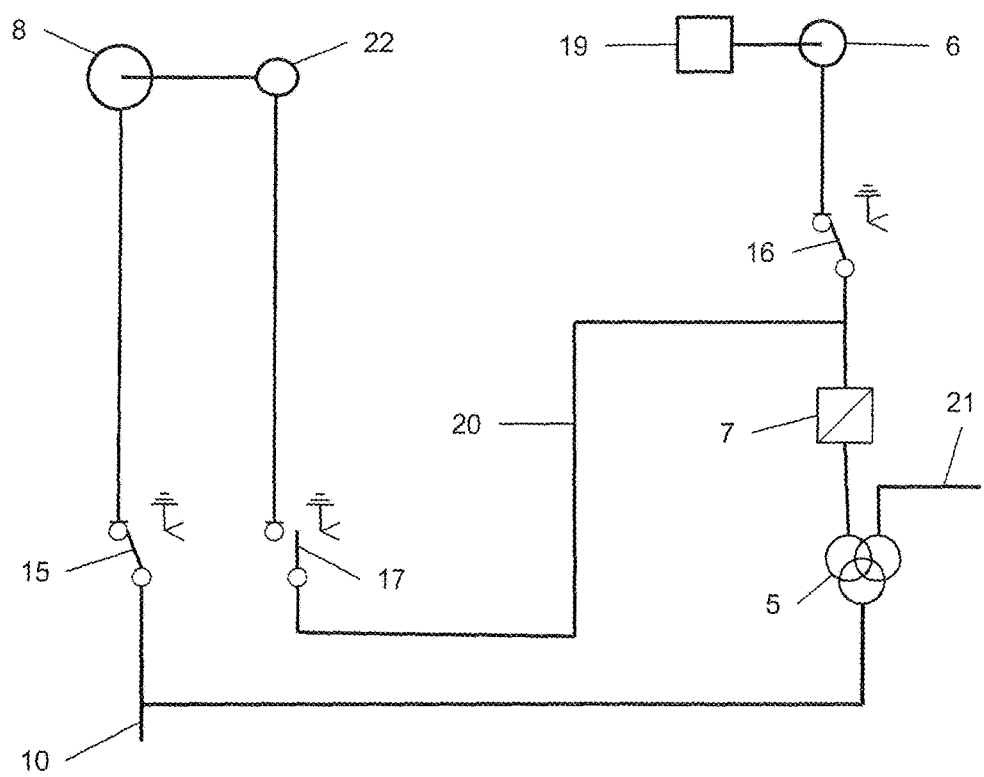

Here:

FIG. 1 shows the outline of a differential gear with an electrical differential drive according to the state of the art, FIG. 2 shows a first embodiment of how an electrical machine can be connected to the converter of the differential system, FIG. 3 shows a second embodiment of how an electrical machine can be connected to the converter of the differential system, and FIG. 4 shows an outline of how an electrical machine can be run up to synchronize with the grid.

DETAILED DESCRIPTION OF THE INVENTION

FIG. 1 shows a system of a wind power plant according to the state of the art. A rotor 1 of the wind power plant, which sits on a drive shaft 9 for a main gearbox 2, drives the main gearbox 2. The main gearbox 2 is a 3-stage gear with two planetary stages and a spur-wheel stage. Between the main gearbox 2 and an electrical machine 8, preferably a remotely-activated synchronous generator, there is located a differential gear 3 with a sun wheel or pinion gear 11, a planetary carrier 12 and a hollow wheel 13. The differential gear 3 is driven by the main gearbox 2 via the planetary carrier 12. The sun wheel 11 is driven via an adaptive reduction stage 4 by a differential drive 6. In order to increase the initial speed for the differential drive 6, in the indicated case, a 2-stage differential drive is selected, which drive has the adaptive reduction stage 4 in the form of a spur-wheel stage between the differential gear 3 and the differential drive 6. The differential drive 6 is a three-phase a.c. machine, which is connected to a grid 10 via a frequency converter 7 and a transformer 5.

The electrical machine 8 is connected to the hollow wheel 13 of the differential gear 3 and is driven by the latter. The speed of the differential drive 6 is regulated in order, on the one hand, to ensure a constant speed of the electrical machine 8 at a variable speed of the rotor 1, and, on the other hand, to regulate the torque in the complete drive train of the wind power plant.

This concept is well-suited for sufficiently strong wind, but is subject to certain limitations because of a limited speed variability primarily for lower speed ranges in the case of low wind speeds.

A wind power plant according to the invention can, aside from the changes according to the invention, be built as described in connection with FIG. 1. Another design of the drive train is also possible, however, as long as it has the features of the claims according to the invention.

The change according to the invention consists in the fact that the differential drive 6 is separated from its electrical supply, in this case, i.e., from the frequency converter 7 and from the transformer 5, and in its place, the synchronous generator 8 can connect to the grid 10 via the frequency converter 7 and the transformer 5, while the differential drive 6 has the run-up to speed 0. Now, the synchronous generator 8 can be further operated via the frequency converter 7 and the transformer 5 at variable speed.

In FIG. 2, a first embodiment of a switch is depicted, with which this can be performed. FIG. 2 shows a concept in which the electrical machine 8, e.g., a 6.3 kV middle-voltage synchronous generator, can be connected via a connecting line 20 to a transformer 14 with the frequency converter 7 and the transformer 5. The transformer 14 is necessary when the synchronous generator 8 has a different nominal voltage from that of the differential drive 6, e.g., the synchronous generator 8 supplies a nominal voltage of 6.3 kV, the power supply 5, 7 of the differential drive 6, but is designed for a nominal voltage of, e.g., 690 V. Other consumers or auxiliary drives or else power sources can also be connected to the transformer 5, as is depicted symbolically by the line 21.

In a wind power plant, preferably a remotely-activated middle-voltage synchronous generator is used. The depicted switch 17 is useful if the no-load losses of the transformer are to be avoided in the case of the synchronous generator 8 that is connected to the grid. In any case, in this operating state, one of the two switches 17 or 18 is necessary in order to separate the synchronous generator 8 from the part of the frequency converter 7 on the motor side as soon as the latter begins to start up the differential drive 6. A significant drawback of the middle-voltage switch 17 is that the latter is significantly more expensive than a low-voltage switch 18. Alternatively, a low-voltage synchronous generator with a nominal voltage that is equal to the part of the frequency converter 7 on the motor side can also be used, by which the transformer 14 and for the most part also the transformer 5 can be eliminated.

The switching process can be carried out in such a way that first the synchronous generator 8 is separated from the grid 10 with a switch 15, and the speed of the differential drive 6 is run up to zero, whereupon the differential drive 6 is secured with a brake 19. Thus, a constant transmission is imparted to the differential gear 3. Then, the differential drive 6 is separated from its power supply 5, 7 with a switch 16. Then, two switches 17, 18, if present, are closed, with which the synchronous generator 8 is connected via the transformer 14 to the earlier power supply of the differential drive 6, i.e., the part of the frequency converter 7 on the motor side and the transformer 5.

The synchronous generator 8 can now feed into the grid 10 at variable speed.

When the wind again reaches a strength that lies above the load limits of the frequency converter 7 or the transformer 5, the switches 17, 18, if present, are opened again, and the differential drive 6 is turned on again with the switch 16, and the brake 19 is released. Then, the generator 8 is synchronized with the grid 10 by means of speed regulation by the differential drive 6, and then the switch 15 is closed.

An alternative method would be not to open the switches 17 and 18, if present, at first and to synchronize the generator 8 with the grid 10 by means of the frequency converter 7 and then to close the switch 15, subsequently or at the same time to open the switch 17, 18, and finally to close the switch 16 and to release the brake 19.

The synchronous generator 8 and the rotor 1 must not be stopped either when switching into the converter mode, in which the synchronous generator 8 is connected via the frequency converter 7 and the transformer 5 to the grid 10, or when switching into the synchronous mode, in which the generator 8 is connected directly to the grid 10.

Another advantageous application of this switch is that the synchronous generator 8 can now also be run up by means of the frequency converter 7 and the transformer 5, which is there in the case of a voltage differential, for, e.g., maintenance tasks, or it can be synchronized with the grid 10 in a system start in the differential mode. The synchronous generator 8 is connected to the grid 10, as described above, by means of the frequency converter 7 and the transformer 5 and in this case works as a motor. As soon as the synchronous generator 8 runs synchronously with the grid, the switch 15 is closed, and the switch 17 and/or 18 is opened.

In FIG. 3, another embodiment of the invention is depicted, in which the synchronous generator 8 either has a nominal voltage that is similar to or the same as the frequency converter 7, or, e.g., a 6.3 kV middle-voltage generator is activated in such a way that the generator output voltage lies in the working voltage range of the frequency converter 7. As a result, the synchronous generator 8 can be connected directly without a transformer to the earlier power supply of the differential drive 6, i.e., the frequency converter 7 and the transformer 5 that is there under certain circumstances. Therefore, the switch 18 or 17 of the embodiment of FIG. 2 can also be eliminated.

Moreover, the switching process is carried out analogously to what is described in FIG. 2.

Instead of synchronous generators, asynchronous machines can alternatively also be used. The drive according to the invention and the method according to the invention can also be used in the industry-drive approaches in the areas of pumps, pump-turbines, compressor drives, and the like. In principle, in this respect, the same applies as explained in FIGS. 2 and 3, whereby the energy in "normal operation" flows in the opposite direction. With reference to FIG. 1, in this case, one power take-off would be the first drive with the drive shaft 9, and the first drive would be the power take-off of the differential gear 3 connected to the electrical machine 8. For the operating modes "moving the drive" for, e.g., maintenance tasks or "running up" the electrical machine 8 and synchronization with the grid 10, the same applies as described in FIG. 2. In this case, the torque that is present for this purpose is essentially limited to the output of the frequency converter 7, and in the case of pumps or pump-turbines coupled directly to the drive, the torque that is necessary for the running-up can be limited by, e.g., compressed air being injected into the pump chamber or the pump chamber being sealed off from the works water channel.

The alternative methods for grid synchronization described in FIG. 2 when using the electrical machine 8 as a drive, in particular an industry drive, would in this case be to synchronize with the grid 10 the electrical machine 8 in the case of closed switches 17 and 18, if present, by means of the frequency converter 7 and then to close the switch 15 and finally or at the same time to open the switch 17 and/or 18. Thus, any type of electrical machine 8 can be switched smoothly to the grid 10. In this case, because of the mechanical conditions of the differential gear 11 to 13, the speed of the differential drive 6 can reach a value that is far above its governed speed range, and the speed of the first drive 9 can be near zero. In this case, the differential drive 6 would begin regulating the drive only as soon as the drive shaft of the differential gear 19 connected to the pinion gear 11 lies in the governed speed range of the differential drive 6. The governed speed range is the speed range in which the differential drive 6 operates in order to be able to achieve the working speed range of the working machine that is to be driven. The governed speed range is determined in this case primarily by the voltage, power and speed limits specified by the manufacturer. Outside of these limits, the differential drive 6 cannot be connected to the grid 10.

FIG. 4 shows an alternative embodiment. In the latter, the synchronous generator 8 is run up by means of an auxiliary drive 22, which preferably is a three-phase a.c. machine and preferably is connected in a coupleable manner to the synchronous generator 8. The auxiliary drive 22 is driven preferably by the frequency converter 7 or alternatively by a separate frequency converter or else directly switched to a grid 10 (if necessary via the transformer 5). Since such a three-phase a.c. machine for running up the synchronous generator 8 can be comparatively small, the resulting volume of purchased electricity in the case of a direct interconnection is also correspondingly small.

Finally, it is also conceivable that instead of the above-mentioned auxiliary drive 22, an auxiliary winding is integrated into the synchronous generator 8.

In the descriptions relative to FIGS. 1 to 4, for the most part middle-voltage synchronous generators were mentioned, which can also be operated in motor mode. The justification for this lies in the high efficiency and the excellent power quality of such electrical machines, which is of special importance in the case of wind power and hydro-electric power applications. In the industrial realm (e.g., pumps, compressors, industry drives, etc.), however, in most cases, low-voltage or middle-voltage asynchronous machines are used. The reason for this lies in the fact that such machines are economical and very sturdy. In principle, however, any other type of electrical machine can also be used.

In principle, this invention can be used for any drive in which a smaller operating-speed range is to be increased and/or an electrical machine must be run up in its operating-speed range or synchronized with a grid. This applies primarily for a large number of industrial applications, such as, e.g., pumps, compressors, drives of mills and crushers and the like.

The invention claimed is:

1. A drive, comprising:
   a drive shaft;
   an electrical machine connected to a power grid; and
   a differential gear with first, second and third drives and first, second and third power take-offs, whereby the first drive/power take-off is connected to the drive shaft, the second drive/power take-off is connected to the electrical machine, and the third drive is connected to a differential drive, which is connected via a frequency converter to the power grid, wherein
   the electrical machine is connected via a first switch to the grid,
   the electrical machine is connected via a second switch to the frequency converter,
   the differential drive is connected via a fourth switch to the frequency converter,
   the electrical machine is alternatively connected to the frequency converter via the second switch and is disconnected from the grid via the first switch while the differential drive is disconnected from the frequency converter via the fourth switch,
   and,
   the electrical machine is connected to the power grid via the first switch and disconnected from the frequency converter via the second switch while the differential drive is connected to the frequency converter via the fourth switch.

2. The drive according to claim 1, wherein the differential drive is connected to a brake.

3. The drive according to claim 1, wherein the electrical machine is connected via a transformer to the frequency converter.

4. The drive according to claim 1, wherein an additional transformer is connected via the second switch and a third switch to the electrical machine and the frequency converter, and the second and third switches are only closed if the fourth switch, which is connected to the differential drive with the frequency converter, is opened.

5. The drive according to claim 1, wherein the electrical machine is a generator of an energy-generating unit, a wind power plant or a hydro-electric power plant.

6. The drive according to claim 1, wherein the electrical machine is a synchronous generator, or a middle-voltage synchronous generator, and is activated so a voltage of the synchronous generator or the middle-voltage synchronous generator corresponds to the voltage of the frequency converter.

7. The drive according to claim 1, wherein the electrical machine has an auxiliary winding, which is connected to the frequency converter.

8. A method for operating a drive with a drive shaft, an electrical machine connected to a power grid, and a differential gear with first, second and third drives and first, second and third power take-offs, whereby the first drive/power take-off is connected to the drive shaft, the second drive/power take-off is connected to the electrical machine, and the third drive is connected to a differential drive, which is connected via a frequency converter to the power grid, comprising:
   providing a first switch for connecting the electrical machine to the grid,
   providing a second switch for connecting the electrical machine to the frequency converter,
   providing a fourth switch for connecting the differential drive to the frequency converter,
   switching from one type of operation, in which both the electrical machine and the differential drive are connected to the grid, by the electrical machine being connected to the power grid via the first switch and being disconnected from the frequency converter via the second switch while the differential drive being connected to the frequency converter via the fourth switch,
   into another type of operation, in which only the electrical machine is connected to the power grid, by the electrical machine being separated from the grid via the first switch, the differential drive being separated from the frequency converter via the fourth switch, and the electrical machine being connected to the frequency converter via the second switch.

9. The method according to claim 8, further comprising:
separating the electrical machine from the grid, and
regulating a speed of the differential drive to zero, and then
separating the differential drive from the frequency converter.

10. The method according to claim 8, wherein the electrical machine is connected to the frequency converter, while a speed of the differential drive remains zero.

11. A method for operating a drive with a drive shaft, an electrical machine that is connected to a power grid, and with a differential gear with first, second and third drives and first, second and third power take-offs, whereby the first drive/power take-off is connected to the drive shaft, the second drive/power take-off is connected to the electrical machine, and the third drive is connected to a differential drive, which is connected via a frequency converter to the power grid, comprising:
providing a first switch for connecting the electrical machine to the grid,
providing a second switch for connecting the electrical machine to the frequency converter,
providing a fourth switch for connecting the differential drive to the frequency converter,
connecting the electrical machine via the frequency converter to the power grid via the second switch and disconnecting from the grid via the first switch; and
operating the electrical machine while the differential drive is separated from the grid via the fourth switch, wherein
then the electrical machine is connected to the power grid via the first switch and the electrical machine is separated from the frequency converter via the second switch, and the differential drive is connected to the power grid via the frequency converter via the fourth switch.

12. The method according to claim 11, wherein the electrical machine is put into operation while a speed of the differential drive is zero.

13. The method according to claim 11, wherein the electrical machine is put into operation for maintenance purposes.

14. The method according to claim 11, wherein the electrical machine is synchronized with the power grid before the electrical machine is separated from the frequency converter.

15. The method according to claim 11, wherein the electrical machine is synchronized with the power grid after separation from the frequency converter and before the electrical machine is connected to the power grid.

* * * * *